H. BRATLIE.
SHOCK ABSORBER FOR VEHICLES.
APPLICATION FILED JULY 26, 1916.
1,223,850.
Patented Apr. 24, 1917.
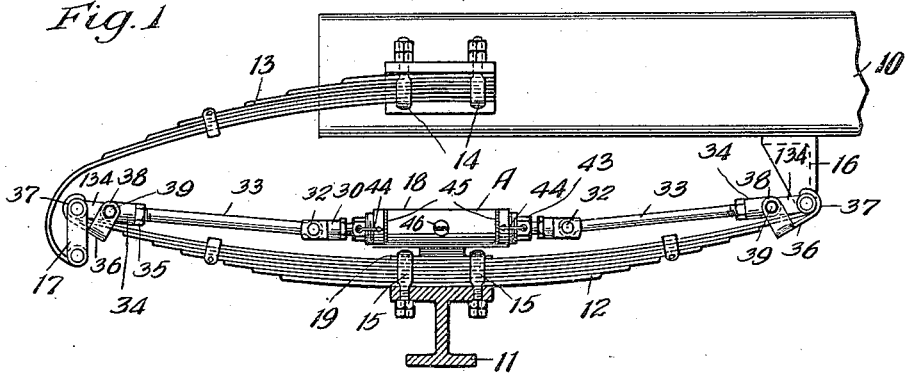
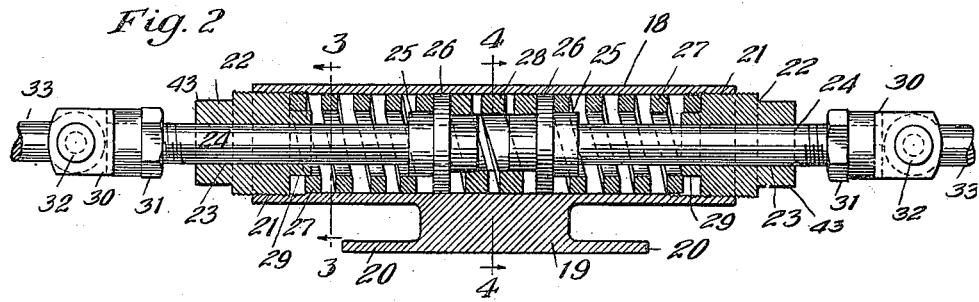
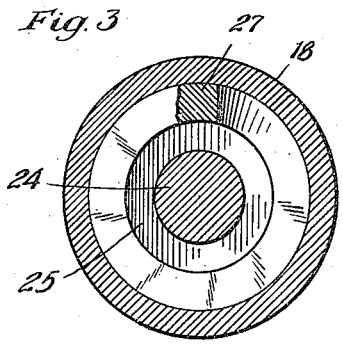
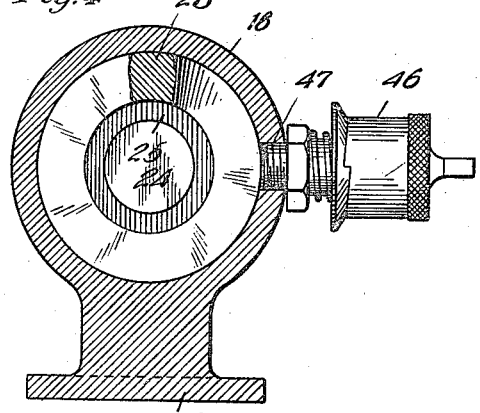
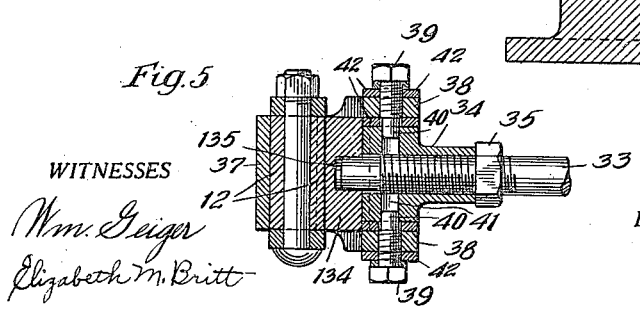
WITNESSES
INVENTOR.
Hans Bratlie
BY George I. Haight
his ATTORNEY

UNITED STATES PATENT OFFICE.

HANS BRATLIE, OF CHICAGO, ILLINOIS.

SHOCK-ABSORBER FOR VEHICLES.

1,223,850.  Specification of Letters Patent.  Patented Apr. 24, 1917.

Application filed July 26, 1916. Serial No. 111,376.

*To all whom it may concern:*

Be it known that I, HANS BRATLIE, a citizen of the United States, residing at Chicago, in the county of Cook and State of Illinois, have invented a certain new and useful Improvement in Shock-Absorbers for Vehicles, of which the following is a full, clear, concise, and exact description, reference being had to the accompanying drawings, forming a part of this specification.

This invention relates to improvements in shock absorbers for vehicles.

The object of the invention is to provide a shock absorber for automobiles and other vehicles which may be readily applied; which is operable to absorb excessive shocks either on the impact or recoil; which is provided with means for adjusting the spring tension; and which is further provided with novel means of attaching the connecting or operating rods to the usual type of main springs now employed.

In the drawing forming a part of this specification, Figure 1 is a part side elevation, part vertical section of a portion of an automobile showing my improvements in connection therewith. Fig. 2 is a longitudinal, enlarged sectional view of the main portion of the shock absorber proper. Figs. 3 and 4 are transverse sectional views, upon enlarged scales, taken on the lines 3—3 and 4—4 of Fig. 2 respectively. And Fig. 5 is a detail sectional view illustrating more particularly the method of attaching the end of a connecting rod to the main spring.

Referring to said drawing, 10 denotes a portion of an automobile chassis, 11 an axle, 12 the lower member and 13 the upper member of a three quarter elliptic main spring, the upper portion of the spring 13 being rigidly attached to the chassis by clips 14—14, the spring 12 being secured to the axle at its center by means of clips 15—15 and at one end pivotally attached to a depending bracket 16. At its other end, the spring 12 is pivotally connected to the outer lower end of the spring 13 by the usual links 17.

The improved shock absorber designated generally by the reference A, comprises a cylinder 18 extended horizontally, and rigidly connected to the axle by a base section 19 having oppositely extended flanges 20—20 over which the clips 15 pass, that are also employed for holding the spring 12. Each end of the cylinder 18 is interiorly threaded at 21 to adjustably receive an exteriorly threaded plug 22. The plugs 22 are centrally perforated as indicated at 23 to receive plunger rods 24 therethrough, each of said rods 24 having at its inner end a plunger 25, the latter having an annular flange 26 of substantially the same diameter as the interior diameter of the cylinder 18. The normal position of the plungers 25 is as indicated in Fig. 2. Confined within the cylinder 18 are three springs 27—27 and 28, the latter being shorter, and preferably heavier, than the other two and confined between the flanges 26—26. The springs 27—27 are located on the outer sides of the flanges 26 of the plungers and fit at their outer ends over bosses 29 formed on the inner ends of the plugs 22.

Each of the rods 24 is threaded at its outer end and has adjustably mounted thereon a forked nut 30, the latter being held in adjusted position by a jam nut 31. Each of the forked nuts 30 has pivotally connected thereto as by a pin 32, an operating rod 33 which, at its outer end, has adjustably threaded thereon a T-shaped nut 34, see Fig. 5. The T-shaped nut 34 is also held in adjusted position by means of a jam nut 35. Pivotally attached to each T-shaped nut 34 is an attaching clip 36, each of the latter comprising a hook shaped end 37 adapted to hook over the pivotal connection of the end of the spring, and a forked inner end comprising two members 38—38. Each of the latter is perforated and threaded to receive a bolt 39, the inner end of which is reduced as indicated at 40 and is extended into a corresponding recess 41 in the head of the T-shaped nut 34. Suitable washers 42—42 are interposed between the heads of the bolts 39 and the forks 38 and also between the latter and the nut 34. A block 134 is inserted between the outer end of the nut 34 and the end of the spring. Said block 134 is centrally recessed as indicated at 135 to receive the end of the rod 33. The manner of attaching each clip to the respective ends of the spring will be apparent from an inspection of Figs. 1 and 5.

Each plug 22 is provided with a polygonal outer end as indicated at 43 to facilitate adjustment by means of a wrench or the like and attached thereto is an indicator 44 (see Fig. 1) which overlaps the adjacent end of the cylinder 18, and is adapted to coöperate with a scale 45 on the cylinder to thereby indicate the degree of compression placed upon the springs.

In order to increase the life of the parts and ease of operation, the cylinder 18 is adapted to be supplied with grease through a grease cup 46 which communicates with the interior of the cylinder 18 through a nipple 47.

In operation, as the axle and chassis approach each other, beyond a predetermined amount, it is apparent that the spring 12 will be straightened out and hence pull the connecting rods 33—33 outwardly relatively to the cylinder 18. This will cause the outward movement of the plungers 25 thus compressing the springs 27. Similarly, upon excessive recoil, the rods 33 will be forced inwardly or toward each other, thus compressing the spring 28. In the latter movement, the amount of compression of the spring 28 is limited by the space between the opposed inner ends of the plungers 25.

From the preceding description, it will be seen that the shock absorber may be readily attached and adjusted to the different types of automobiles; a secure connection is provided between the ends of the rods 33 and the ends of the springs; the spring tension within the shock absorbers may be adjusted as desired; and the rods 33 and rods 24 are under substantially direct tension in absorbing the excessive impact shocks, thus permitting of the same being made relatively light.

The attaching clip 36, as clearly shown in Fig. 1 of the drawings, hooks over the ends of the spring 12 and by reason of the attachment of the rods 33 to these clips, the shock absorber can be very readily applied to and removed from vehicle springs without disconnecting said springs at their ends, or otherwise disturbing the vehicle parts.

Although I have herein shown and described what I now consider the preferred embodiment of the invention, the same is merely illustrative and I contemplate all changes and modifications that come within the scope of the claims appended hereto.

I claim:

1. In a shock absorber of the character described, the combination with a spring container, of a spring within said container, a plunger within the container for compressing said spring, a connecting rod operatively attached to the plunger, and means for attaching the free end of said rod to the main spring or other part of a vehicle, said means including a clip bent into hook shape at one end and forked at its other end, the forked end being pivotally connected to the end of said rod and the hook shaped end of the clip fitting over the spring or other portion of the vehicle.

2. A shock absorber of the character described comprising, a spring controlled plunger, a rod for actuating said plunger and means for connecting the outer end of said rod to the main spring or other suitable portion of a vehicle, said means including an adjustably threaded nut mounted on the end of said rod, and a clip pivotally attached to said nut, said clip having a hook shaped end adapted to fit over a main spring end or other suitable portion of the vehicle.

3. The combination with the chassis, axle, and main spring of an automobile, of a shock absorber, the latter comprising a spring chamber rigidly attached to the axle, springs within said chamber, plungers for compressing said springs, oppositely extended rods for actuating said plungers, and means for connecting the ends of said rods to portions of the main spring whereby, upon relative approach of the chassis and axle, the rods will be pulled apart, and upon relative separation from normal position of the chassis and axle, the rods will be forced toward each other.

4. The combination with a shock absorber, including a spring and a plunger for compressing the spring, of a connecting rod attached to the plunger, and means for attaching the free end of said rod to the spring or other portion of a vehicle, said means including a hook-shaped member adapted to fit over the end of said spring or other portion of the vehicle, said hook-shaped member being pivotally connected to said free end of the rod.

In witness that I claim the foregoing I have hereunto subscribed my name this 18th day of July 1916.

HANS BRATLIE.

Witnesses:
ELIZABETH M. BRITT,
LUCILLE HIGGINS.

Copies of this patent may be obtained for five cents each, by addressing the "Commissioner of Patents, Washington, D. C."